Figure 1:
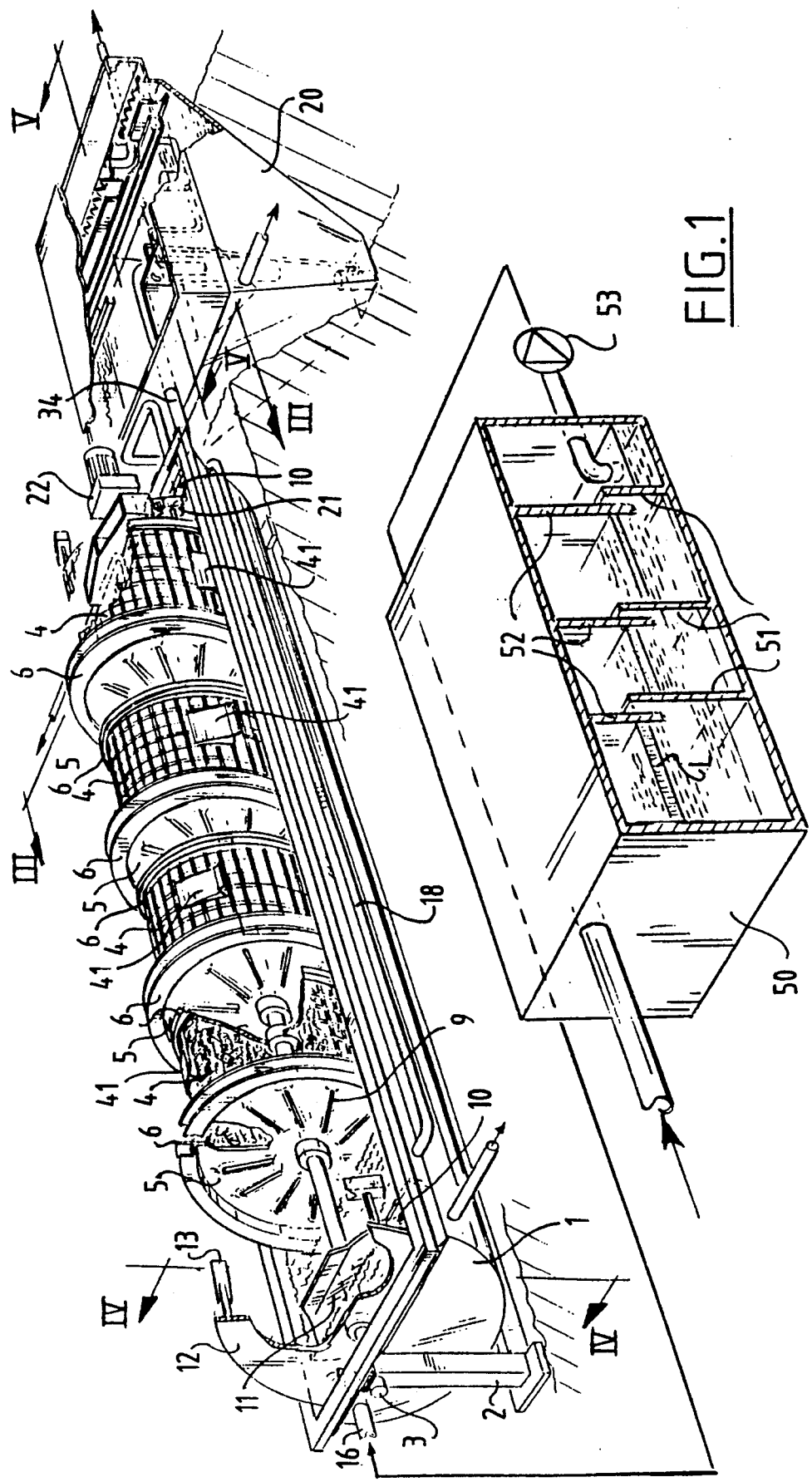

United States Patent [19]

Stilkenboom

[11] Patent Number: 5,290,435
[45] Date of Patent: Mar. 1, 1994

[54] AEROBIC PURIFICATION INSTALLATION

[75] Inventor: Pieter A. Stilkenboom, Bergeyk, Netherlands

[73] Assignee: Arie Cornelis de Vries, Waalre, Netherlands

[21] Appl. No.: 964,614

[22] Filed: Oct. 22, 1992

[30] Foreign Application Priority Data

Oct. 23, 1991 [NL] Netherlands .................. 9101776

[51] Int. Cl.⁵ .............................................. C02F 3/08
[52] U.S. Cl. .................................. 210/151; 210/161; 210/195.1; 210/619
[58] Field of Search .............. 210/150, 151, 195.1, 210/196, 619, 161

[56] References Cited

U.S. PATENT DOCUMENTS

| | | | |
|---|---|---|---|
| 3,389,798 | 6/1968 | Hartmann et al. | 210/619 |
| 3,817,857 | 6/1974 | Torpey | 210/619 |
| 3,894,953 | 7/1975 | Torpey | 210/151 |
| 3,956,127 | 5/1976 | Holmberg | 210/150 |
| 4,200,532 | 4/1980 | Iwatani et al. | 210/151 |
| 4,468,326 | 8/1984 | Kawert | 210/619 |
| 4,999,302 | 3/1991 | Kahler et al. | 210/619 |

Primary Examiner—Christopher Upton
Attorney, Agent, or Firm—Wells, St. John, Roberts, Gregory & Matkin

[57] ABSTRACT

A device for aerobic purification of industrial and/or household waste water, which device comprises a trough-like container for receiving the water for treating, at least two rotatably mounted contactors introduced into the container and having filler elements such as rings arranged loosely therein, feed means for feeding the contaminated water in doses into the container and a sludge collection space for settling the aerobically treated waste water lying behind the container and connected thereto via an overflow, which device is distinguished in that a seal is arranged between the contactors to prevent a direct flow from the one contactor to the other, wherein resistance means are arranged for transporting therebetween of waste water with increased resistance in order to aerobically treat the waste water in each contactor to a sufficient extent.

15 Claims, 5 Drawing Sheets

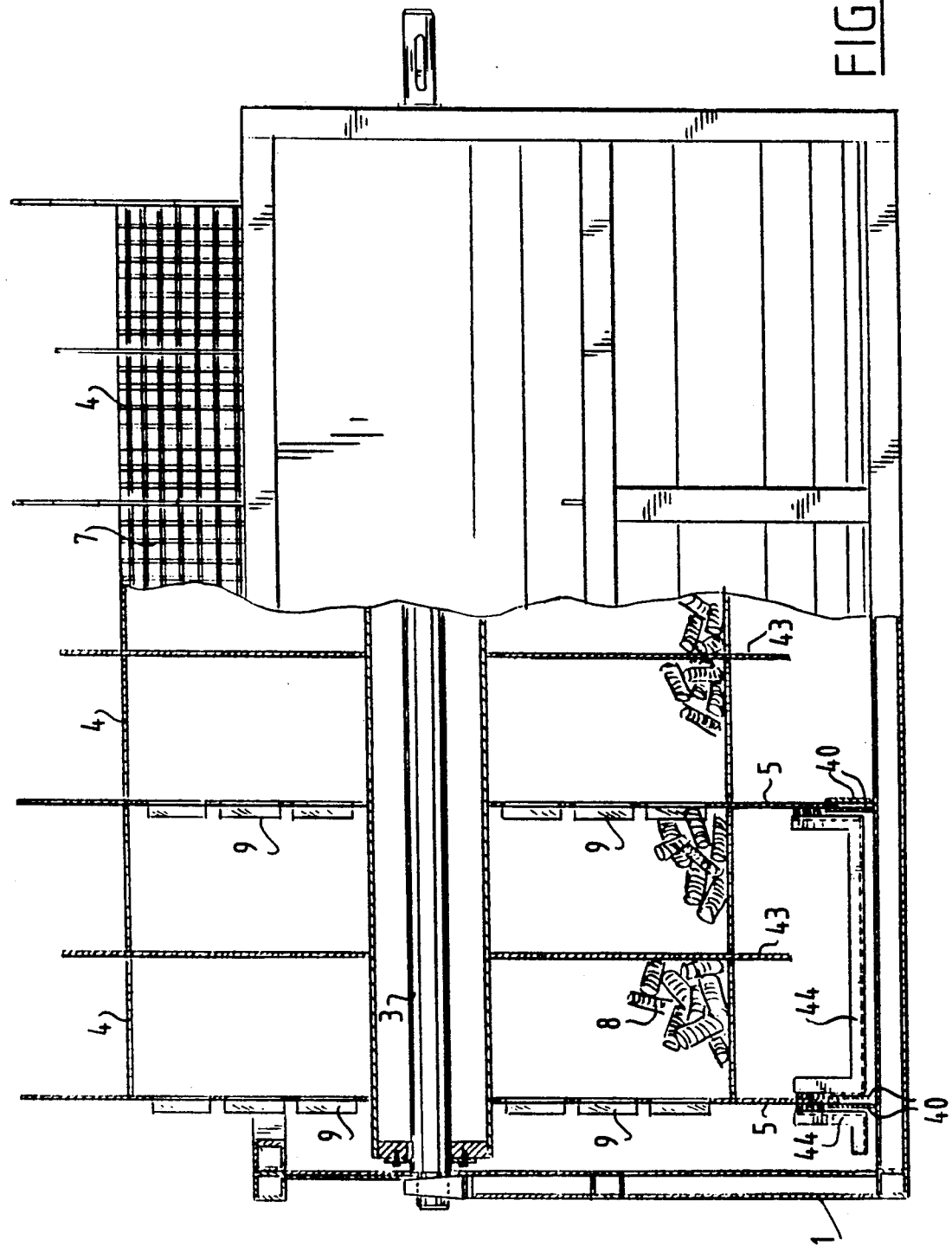

AEROBIC PURIFICATION INSTALLATION

The invention relates to a device for aerobically purifying industrial and/or household waste water, which device comprises a trough-like container for receiving the water for treating, at least two rotatably mounted contactors introduced into the container and having filler elements such as rings arranged loosely therein, feed means for feeding the contaminated water into the container in doses and a sludge collection space for settling the aerobically treated waste water lying behind the container and connected thereto via an overflow.

Such a device is known in diverse embodiments, which however take up quite a large amount of space. This volume required for installing such a device is the result of the inaccurate, uncontrollable water flows from the one treatment contactor to the other, whereby the waste water for treating is not optimally purified. Aerobic treatment of waste water takes place in the rotating contactors which regularly bring the waste water into contact with the ambient air. Because of the short circuit flows a part of the waste water is thereby not sufficiently treated aerobically.

The invention has for its object to obviate the above stated drawback and provides to this end a device which is distinguished in that a seal is arranged between the contactors to prevent a direct flow from the one contactor to the other, wherein means are arranged for transporting therebetween of waste water with increased resistance.

Due to the seal and the continuous resistance to unimpeded transport from the one contactor to the other of the waste water for treating, not only is the undesirable short circuit flow prevented but the waste water is also fed to the following step in the treatment process such that the total flow through the device is fully controllable. The waste water thereby has enough time per step in the treatment process to be effectively aerated whereby the desired aerobic purification can take place.

In a preferred embodiment wherein the container has in cross section a semi-circular form, the seal is formed according to the invention by at least one circular wall co-rotating with each contactor, the outer edge of which wall connects close-fittingly onto the inner wall of the container. It has been found in practice that such a seal is sufficient since the remaining gap between the outer edge of the wall and the inner wall of the container is automatically sealed by the growth of biomass.

It is herein recommended to use in each case two walls per contactor which simultaneously form the front and rear wall of the contactor.

The seal can be improved still further by providing the outer edge of each wall with a U-shaped flange opening to the outside.

The resistance means are preferably formed by at least one blade-like element which is arranged on a wall and is arranged protruding in the front wall and trailing in the rear wall in relation to the direction of rotation.

The blade-like elements preferably take an elongate form and extend in practically radial or radial sense relative to the rotation shaft and are of a shape such that at each water level they allow passage in limited manner of an equal amount of waste water.

In order to improve the aerobic treatment process a return pipe is arranged which extends from the rear side of the trough-like container, as seen in transporting direction of the waste water, to the front side thereof.

Herewith the treated waste water can partially be guided back to the beginning of the aerobic process and/or to any possible preceding processes, which furthers bacteria formation in the process and therefore augments the purification of the waste water.

According to a further step a part of the treated water can be guided via a pipe to an anaerobic installation for denitrification.

Above mentioned and other features are elucidated further in the figure description of an embodiment hereinbelow.

Figure 2:
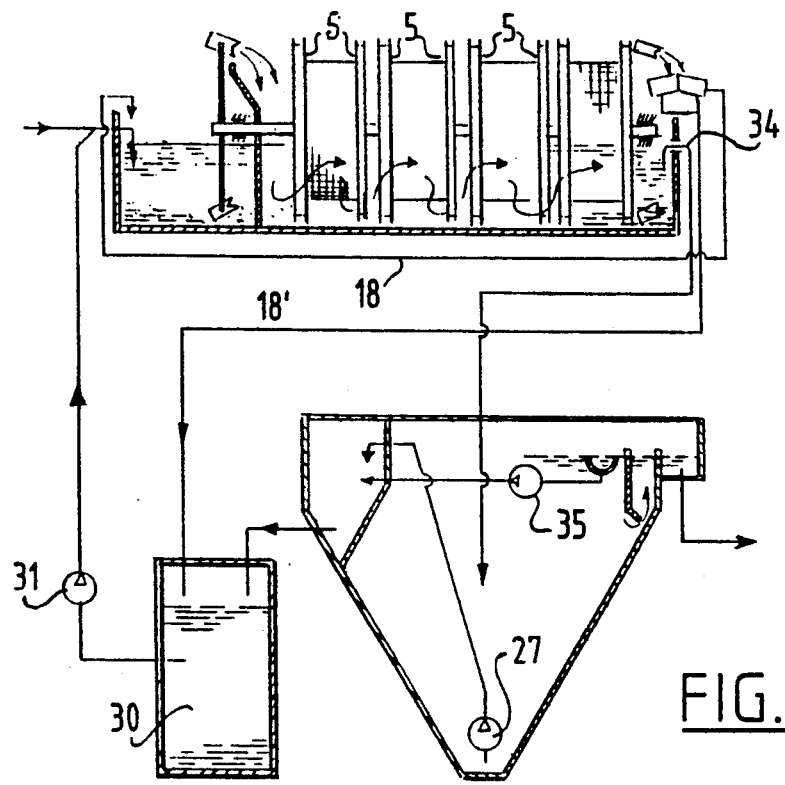
Figure 3:
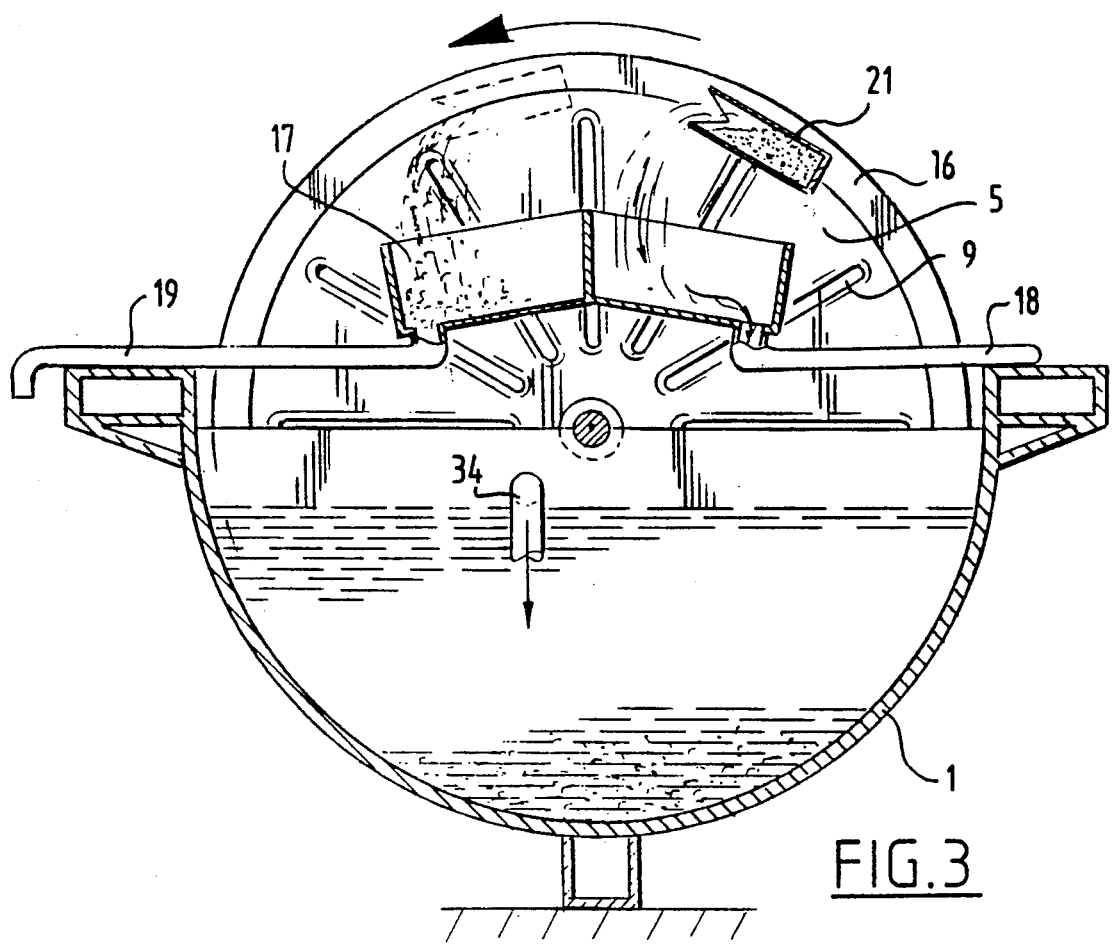
Figure 4:
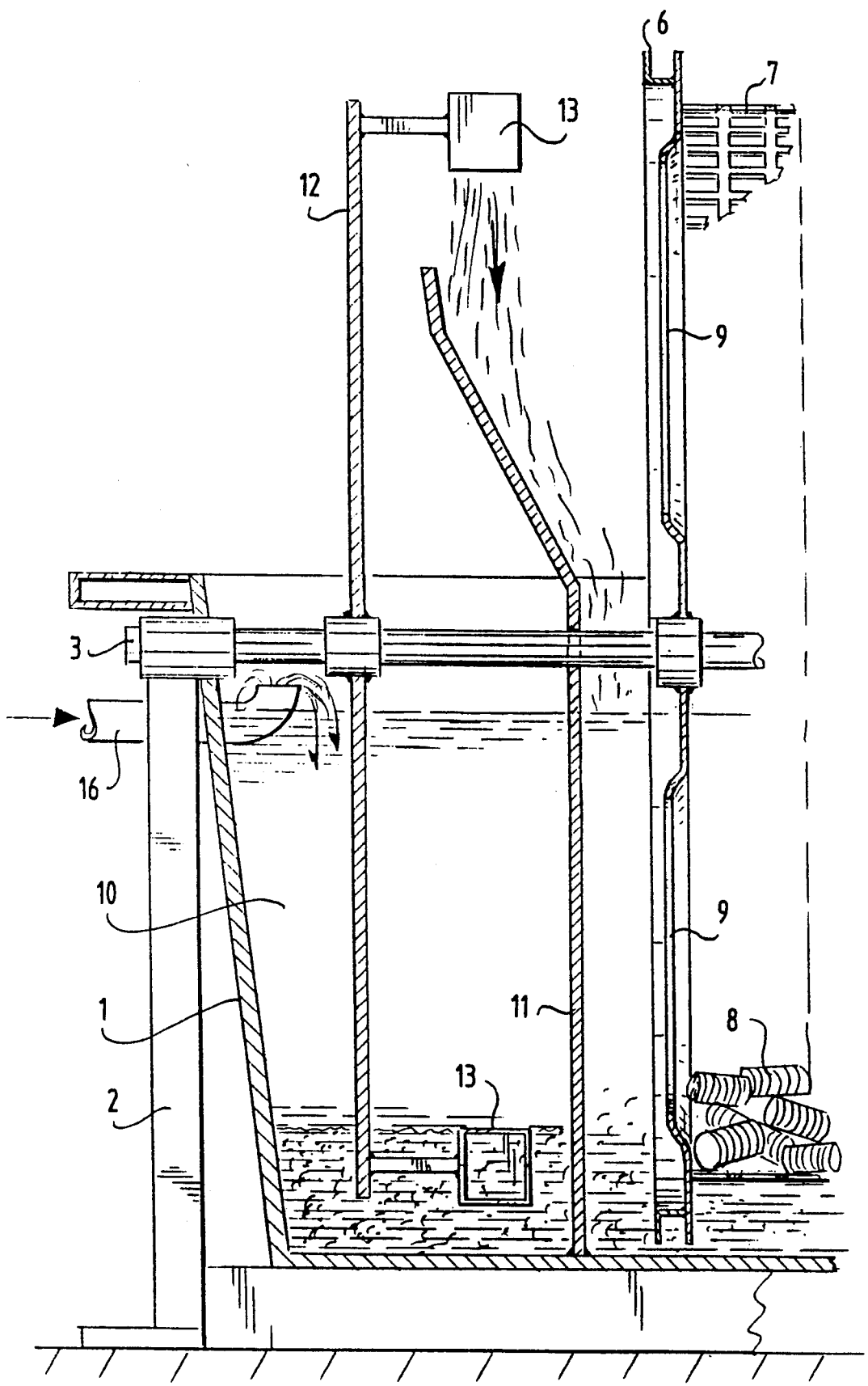
Figure 5:
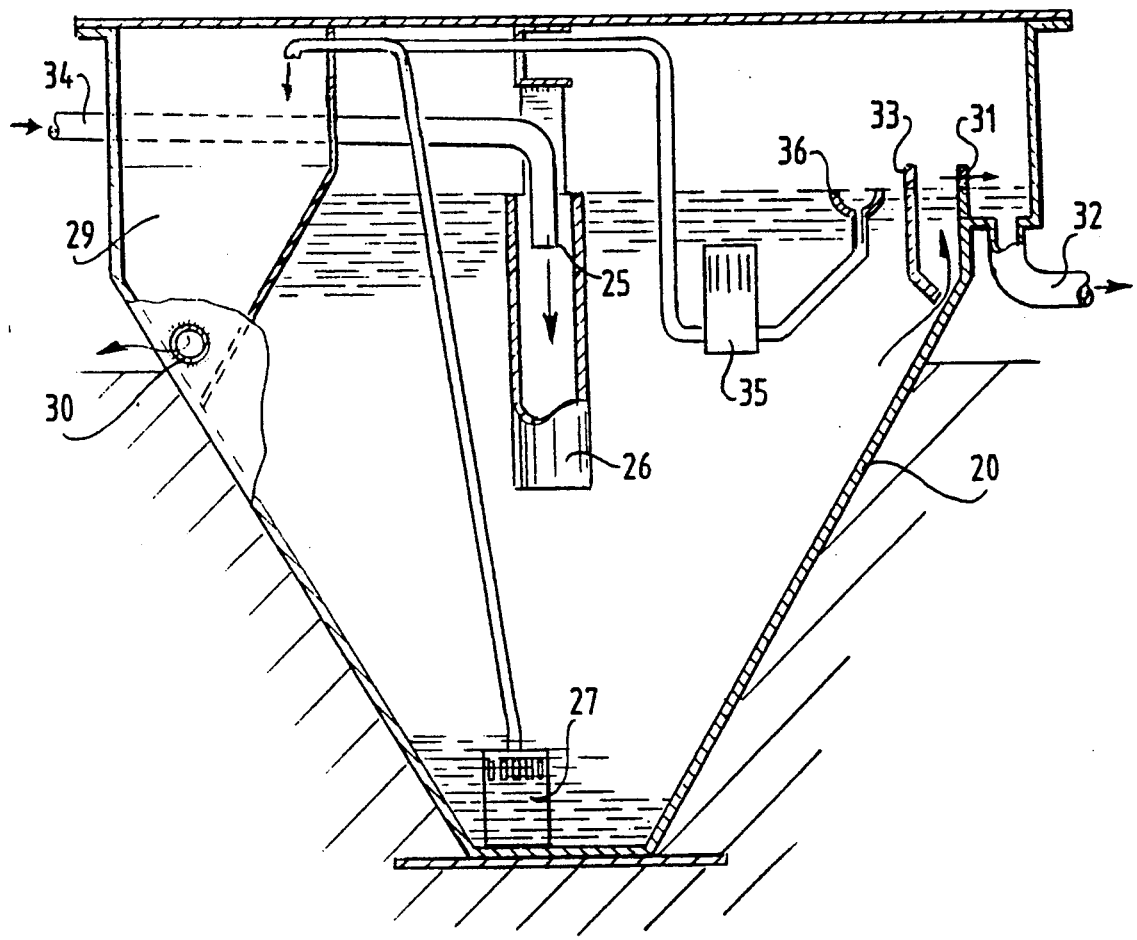

In the drawing:

FIG. 1 shows a perspective top view of an anaerobic and aerobic purification device according to the invention, FIG. 2 shows a schematic disposition of the different elements in the device according to FIG. 1, FIG. 3 shows an axial view or section along the line III—III in FIG. 1, FIG. 4 is a standing side view or cross section of the device of FIG. 1 along the line IV—IV, FIG. 5 shows a standing section through the settling tank over the line V—V in FIG. 1, FIG. 6 shows a standing longitudinal section of an alternative embodiment of the rotor contactor.

The device shown in FIG. 1 consists of a semi-circular container 1 which can either be supported on a frame 2 or be set in a concrete construction, which will not be further elucidated here. Mounted centrally in the semi-circular trough is a drive shaft 3 onto which a number of circular contactors 4 are fixedly attached. In the embodiment shown four contactors are arranged but the number depends on the desired purification capacity of the device. Each contactor has a front and rear wall 5 whereof at least the front wall can be provided with a peripheral edge in the form of an U-shaped flange 6 opening to the outside. On the other hand, annular segments 40 can be arranged in the container along which or between which run the front and terminal walls, see FIG. 6. The contactor itself is embodied with a shell of perforated plate 7, wherein the contactor is filled with random material 8 for example plastic rings or pieces of tube, which elements serve to enlarge the adhesion surface for bacteria which are necessary for purifying the waste water. The elements are thrown loose into the contactors 4 which prevents excessive growth of bacteria and prevents channel forming.

Each contactor is provided with one or more air scoops 41 which are incorporated in the shell. The air scoop carries air with it during rotation and takes it into the bottom of the container 1. The air scoop also carries with it waste water from the tank and empties this over the filler elements.

According to the invention it is proposed to make the outer periphery of the U-shaped outer edge 6 connect close-fittingly onto the inner wall of the trough-like container 1, also see FIG. 3. The remaining gap is sealed by the growth of biomass so that in each case a compartment is obtained between the terminal walls of the contactor 4. This avoids short circuit flows along the contactors.

It is noted that the terminal walls 5 of each contactor 4 are provided with radially oriented slot-like openings 9 which serve to impede a free through-flow of water and which are obtained by pressing out a wall part of the wall 5, also see FIG. 4. The bulge is such that a blade-like element is created which is disposed protruding only in the front wall to carry into the contactor in each case a part of the quantity of water lying outside the contactor 4.

It is also noted that each contactor 4 can have both a front and a terminal wall, see FIG. 2, instead of a single terminal wall as according to the embodiment in FIG. 1. In this case the blade-like elements 9 are disposed trailing in the terminal wall.

The installation is provided at the front with a reservoir 10 which is separated by means of a fixed partition 11 from the part in which the contactors 4 rotate. Arranged in the reservoir on the central shaft is a round disc to which is fixed a number of box-shaped scoop elements 13.

These box-shaped scoop elements 13 mounted on the round disc 12 lie in reservoir 10 in which is situated a portion of partition 11 placed at an angle. The dosed waste water from the scoop elements flows via partition 11, see also FIG. 4.

A connecting pipe 16 in which the waste water for treating is supplied, discharges into the foremost reservoir portion 10.

Arranged in the rear reservoir 10 is a collecting tray 17 which has separate outlets. The one outlet of the trough leads to a return pipe 18 which discharges in the front reservoir 10, the other leads to return pipe 19 which can lead to preceding processes. An outlet 34 is further arranged which leads to a settling tank 20 to be further elucidated below which is placed close to the trough-like container 1. Scoop elements 21 which correspond with the elements 13 and which carry the treated waste water into the trays 17 are also arranged in the rear reservoir portion 10.

It is finally noted that a central drive motor 22 is arranged on the rear end of the shaft 3 to bring about rotation of all contactors 4 including the wall 12 with the scoop elements 13 and the elements 21 close to the rear contactor.

As already stated above, a settling tank 20 is arranged close to the trough-like container 1 which is shown in FIG. 1 as a funnel-shaped container which is partially sunk into the ground. The pipe 34 has an outlet opening 25 which debouches into a tubular guide element 26 which is placed in vertical position. Arranged in the trough-shaped bottom end of the settling tank 20 is a sludge pump 27 of which the discharge 28 leads to a reservoir 29 with outlet opening 30 for draining the sludge. The cleaned water is drained via submerged plate 33 and overflow comb 31 to pipe 32 and can be discharged onto surface water or infiltrated into the ground.

Rising particles and foam are collected in the tank against the submerged plate 33 by the flow direction. These floating particles are carried into reservoir 29 via gutter 36 and sludge pump 35.

The above mentioned device operates as follows. By supplying waste water for treating via pipe 16 into the front reservoir space 10 of the trough-like container 1, this part will be filled with the waste water to a maximum level which is equivalent to the top end of the fixed partition 11. By causing the shaft 3 and thereby the box-shaped scoop elements 13 to rotate, a fixed quantity of waste water at a time is scooped out of the front reservoir portion 10 irrespective of the level in reservoir portion 10 and, as a result of the tipping of the scoop shaped elements 13, poured onto partition 11. From there the water runs via the partition 11 to the part of the trough-like space 1 in which the contactors 4 are situated. Here the water will be able to enter the contactor elements 8 due to the blade-like slits 9 in the front wall 5 of the contactor. The water is thereby brought into intimate contact with the elements 8 which are themselves lifted out of the quantity of water each time by the rotation of the contactor 4. Hereby and due to the air scoops occurs an exceptionally good aeration of the quantity of water in the trough-like container 1, which ensures the good bacteria formation necessary for the aerobic purification of the waste water.

The waste water is carried in each case over a partition to a new contactor 4 by the continuously dosed transport as a result of the action of the blades 9 and the input of the scoop elements 13. At the rear end a part of the water is scooped out of the section of the trough-like container 1 in which the contactors rotate by the scoop elements 21, wherein the water is discharged via the collecting trays 17. A portion of the treated water is returned via the return pipes 18 and 19 to the beginning of the trough-like container 1, namely the front reservoir 10 or to a preceding process. This portion contains a number of bacteria which is necessary to already initiate a bacteria formation there and to activate bacteria already present.

Another portion of the water is directly discharged to the settling tank 20 where the water with the flocculated sludge particles is carried down into an undisturbed environment via the tube 26, where a separation can take place as a result of the force of gravity. The collected sludge is discharged via pump 27 and the captured floating material via pump 35 to the pump reservoir 19. The cleaned water can be drained via submerged plate 33 and via the comb 31 and be discharged via pipe 32 onto surface water or infiltrated into the ground.

The waste water that is supplied via feed 16 into the container 1 can be anaerobically treated beforehand in a closed tank 50 which is divided into compartments by partition walls 51 which decrease in height in the flow direction. A screen 52 is placed in front of each wall 51 which serves to hold back the floating layer L so that only "clean" water flows to the next compartment. A pump 53 guides the pre-treated water to feed pipe 16 for further aerobic treatment.

FIG. 2 shows that a part of the return pipe 18 or 19 can likewise be branched with a pipe 18' which leads to another anaerobic buffer tank 30 or 50 in FIG. 1, which has a pump discharge which leads to the beginning of the trough-like container 1, namely the front reservoir 10. A pump 31 provides transport of this anaerobically cleaned water.

Shown in FIG. 6 is an alternative embodiment wherein the same numerals are used for the same components.

Here the contactor is provided with a closed partition 43, the outer periphery of which is smaller than that of the terminal walls. The water is hereby urged to run along the outer periphery. A U-shaped bracket 44 is further arranged between front and terminal wall 5 which serves as stirring member in order to loosen sludge sediment in the bottom of the container 1.

The invention is not limited to the above described embodiment.

I claim:

1. A device for aerobic purification of industrial and/or household waste water, comprising:
   a trough-like container for receiving waste water for treating;

at least two contactors mounted for rotation within the trough-like container;

filler elements arranged loosely within the contactors;

feed means for feeding the waste water in doses into the trough-like container;

a peripheral seal positioned to prevent direct flow of waste water from the exterior of one contactor to another, said seal comprising a U-shaped channel which fits between the trough-like container and at least one of the two contactors, the U-shaped channel providing for biomass growth therein to seal between the trough-like container and said at least one of the two contactors; and means for transporting waste water between contactors.

2. A device as recited in claim 1, wherein the trough-like container has a semi-circular cross section, the device further comprising at least one circular wall which co-rotates with the two contactors, the circular wall having an outer edge, the seal being formed between the trough-like container and the outer edge of said circular wall.

3. A device as recited in claim 1, wherein the trough-like container has a semi-circular cross section, the device further comprising at least one circular wall which co-rotates with the two contactors, the circular wall having an outer edge, the U-shaped channel being formed on the outer edge of said circular wall and being outwardly open therefrom.

4. A device as recited in claim 1, wherein:
the trough-like container has a semi-circular cross section;
each contactor has at least one end wall;
at least one of the end walls is positioned between the two contactors, said one of the end walls having an outer edge, the U-shaped channel being formed on the outer edge of said one of the end walls.

5. A device as recited in claims 1, 2, 3, or 4, wherein the means for transporting waste water between contactors comprises blade-like elements positioned for rotation with the contactors to carry waste water into each contactor.

6. A device as recited in claims 1, 2, 3, or 4, wherein each contactor has at least one end wall, the means for transporting waste water between contactors comprising blade-like elements positioned for rotation with the contactors to carry waste water into each contactor, each blade-like element being formed by a portion pressed out of one of the end walls.

7. A device as recited in claims 1, 2, 3, or 4, wherein each contactors has at least one end wall, the means for transporting waste water between contactors comprising blade-like elements positioned for rotation with the contactors to carry waste water into each contactor, each blade-like element being formed by a portion pressure out by one of the end walls, each blade-like element having an elongate form which extends in a radial direction.

8. A device as recited in claim 1, wherein the trough-like container has a rear part and a front part, the device further comprising a return pipe which connects the rear part to the front part.

9. A device as recited in claim 1, wherein the trough-like container has a rear part and a front part, the device further comprising a return pipe which connects the rear part to the front part, the return pipe being partially branched to an anaerobic purification installation.

10. A device as recited in claims 1, 2, 3, 4, 8 or 9, each contactor is provided with a front end wall, a rear end wall, and an internal partition, said internal partition having an outer peripheral edge which is smaller than that of the front and rear end walls.

11. A device as recited in claim 1 and further comprising a sludge collection space for settling treated waste water lying behind the trough-like container, the sludge collection space being connected to the trough-like container via an overflow.

12. A device as recited in claim 1, wherein the trough-like container has a semi-circular cross section, the device further comprising at least one circular wall which co-rotates with the two contactors, the U-shaped channel being formed by at least two wall portions which extend radially from said circular wall, said two wall portions being spaced axially from each other to provide for biomass growth therebetween.

13. A device for aerobic purification of industrial and/or household waste water, comprising:
a trough-like container for receiving waste water for treating, the trough-like container having a semi-circular cross section;
at least two circular contactors mounted for rotation within the trough-like container, the contactors having interiors which are separated from each other by a co-rotating circular wall between the contactors, the co-rotating circular wall having an outer edge;
filler elements arranged loosely within the contactor interiors;
feed means for feeding the waste water into the trough-like container;
a peripheral seal positioned to prevent direct flow of waste water from the exterior of one contactor to another, said seal comprising a U-shaped channel which fits closely between the trough-like container and the outer edge of the co-rotating circular wall, the U-shaped channel providing for biomass growth therein to seal between the trough-like container and the co-rotating circular wall; and
means for transporting waste water between contactors.

14. A device as recited in claim 13 wherein the U-shaped channel extends from the outer edge of said circular wall and is outwardly open therefrom.

15. A device as recited in claim 13 wherein the U-shaped channel is formed by at least two wall portions which extend radially from the outer edge of said circular wall, said two wall portions being spaced axially from each other to provide for biomass growth therebetween.

* * * * *